US011466910B2

(12) United States Patent
Bates et al.

(10) Patent No.: US 11,466,910 B2
(45) Date of Patent: Oct. 11, 2022

(54) SYSTEMS AND METHODS FOR REDUCING FROST ACCUMULATION ON HEAT PUMP EVAPORATOR COILS

(71) Applicant: Rheem Manufacturing Company, Atlanta, GA (US)

(72) Inventors: Douglas M. Bates, Midlothian, VA (US); Christopher M. Puranen, Prattville, AL (US)

(73) Assignee: RHEEM MANUFACTURING COMPANY, Atlanta, GA (US)

( * ) Notice: Subject to any disclaimer, the term of this patent is extended or adjusted under 35 U.S.C. 154(b) by 150 days.

(21) Appl. No.: 16/871,201

(22) Filed: May 11, 2020

(65) Prior Publication Data
US 2021/0348817 A1 Nov. 11, 2021

(51) Int. Cl.
*F25B 47/02* (2006.01)
*F25B 30/02* (2006.01)

(52) U.S. Cl.
CPC ............ *F25B 47/022* (2013.01); *F25B 30/02* (2013.01); *F25B 47/025* (2013.01)

(58) Field of Classification Search
CPC ...... F25B 47/02; F25B 47/022; F25B 47/025; F25B 30/00; F25B 30/02; F25B 2347/02; F25B 2347/021; F25B 2347/022; F25B 2347/023; F25B 2700/11
See application file for complete search history.

(56) References Cited

U.S. PATENT DOCUMENTS

| | | | | |
|---|---|---|---|---|
| 5,319,943 | A * | 6/1994 | Bahel | F25B 47/025 62/156 |
| 9,341,405 | B2 * | 5/2016 | Qu | F25D 21/002 |
| 9,605,889 | B2 * | 3/2017 | Qu | F25D 21/02 |
| 9,803,911 | B2 * | 10/2017 | Qu | F25D 21/02 |
| 10,352,611 | B2 * | 7/2019 | Qu | F25B 47/02 |
| 10,415,861 | B2 * | 9/2019 | Takenaka | F25B 5/02 |
| 10,627,143 | B2 * | 4/2020 | Kim | F25B 7/00 |
| 10,655,877 | B2 * | 5/2020 | Liu | F25B 49/022 |
| 10,718,549 | B2 * | 7/2020 | Pugh | F24H 9/2007 |
| 10,746,444 | B2 * | 8/2020 | Kim | F25D 21/12 |
| 10,746,455 | B2 * | 8/2020 | Kim | F25B 41/37 |
| 10,823,482 | B2 * | 11/2020 | Chamoun | F25B 30/02 |
| 11,073,317 | B2 * | 7/2021 | Kim | F25B 5/04 |

(Continued)

FOREIGN PATENT DOCUMENTS

| | | |
|---|---|---|
| CN | 202382493 U | 8/2012 |
| WO | 2009094691 A1 | 8/2009 |
| WO | 2016083858 A1 | 6/2016 |

OTHER PUBLICATIONS

International Search Report and Written Opinion for PCT Application No. PCT/US2021/029843 dated Aug. 5, 2021.

*Primary Examiner* — Miguel A Diaz
(74) *Attorney, Agent, or Firm* — Eversheds Sutherland (US) LLP (57) ABSTRACT

The disclosed technology includes systems and methods of reducing frost accumulation on a heat pump evaporator coil. The disclosed technology can include a heat pump assembly having an evaporator coil, a fan configured to direct air across the evaporator coil, a temperature sensor, and a controller configured to energize the fan to direct air across the evaporator coil when the temperature of the evaporator coil is below a threshold temperature.

20 Claims, 5 Drawing Sheets

(56) References Cited

U.S. PATENT DOCUMENTS

| | | | | |
|---|---|---|---|---|
| 2011/0005245 A1* | 1/2011 | Pussell | F24D 11/0214 | |
| | | | | 62/89 |
| 2011/0289946 A1* | 12/2011 | Miura | F25B 47/006 | |
| | | | | 62/80 |
| 2014/0033745 A1* | 2/2014 | Pillot | D06F 58/206 | |
| | | | | 62/115 |
| 2014/0150477 A1* | 6/2014 | Qu | F25D 21/006 | |
| | | | | 62/80 |
| 2017/0030615 A1* | 2/2017 | Kim | F25D 21/12 | |
| 2017/0030619 A1* | 2/2017 | Kim | F28F 1/325 | |
| 2017/0030627 A1* | 2/2017 | Kim | F25D 11/022 | |
| 2017/0030628 A1* | 2/2017 | Sanders | F25D 21/04 | |
| 2017/0241693 A1* | 8/2017 | Tajika | F25B 47/022 | |
| 2017/0276422 A1* | 9/2017 | Chamoun | F25B 30/02 | |
| 2018/0266736 A1* | 9/2018 | Kim | F25B 21/04 | |
| 2019/0128565 A1* | 5/2019 | Pugh | F24H 9/02 | |
| 2019/0154321 A1* | 5/2019 | Takenaka | F25B 47/02 | |
| 2019/0226706 A1* | 7/2019 | Liu | F24F 1/0018 | |
| 2020/0208891 A1* | 7/2020 | Kim | F25B 47/022 | |
| 2020/0208897 A1* | 7/2020 | Sjoholm | F25B 49/02 | |
| 2020/0224951 A1* | 7/2020 | Seong | F25D 11/022 | |
| 2020/0256601 A1* | 8/2020 | Kim | F25D 21/12 | |
| 2020/0333059 A1* | 10/2020 | Kim | F25B 47/022 | |
| 2021/0063068 A1* | 3/2021 | Lee | F25D 17/065 | |
| 2021/0341194 A1* | 11/2021 | Kim | F25B 5/04 | |

* cited by examiner

SYSTEMS AND METHODS FOR REDUCING FROST ACCUMULATION ON HEAT PUMP EVAPORATOR COILS

FIELD OF TECHNOLOGY

The present disclosure relates generally to systems and methods for reducing frost accumulation on heat pump evaporator coils.

BACKGROUND

When a heat pump is operating to warm a building, it is common for the evaporator coil temperature to fall below the ambient air temperature. The temperature difference between the evaporator coil and the ambient air leads to moisture accumulation on the evaporator coil as moisture in the ambient air condenses on the colder evaporator coil. In certain conditions, the temperature of the evaporator coil will fall below freezing and cause the accumulated moisture to eventually freeze, forming frost and ice. This can be particularly troublesome in regions of the world where air temperature can remain above freezing but still be cool enough to necessitate operating a heat pump to warm a building. In these conditions, the evaporator coil temperature will fall below zero and moisture in the air will continue to accumulate as frost and ice on the evaporator coil until the coil rises above the freezing temperature of water. As the frost continues to accumulate on the evaporator coil, the heat pump can experience degraded performance and damaged components.

To reduce frost accumulation, many heat pump systems will operate the heat pump in a reverse cycle to move heated refrigerant through the frosted coil until the frost is melted. Running the heat pump in a reverse cycle, however, causes the heat pump system to begin injecting cool air into the heated building. To ensure the building is not unnecessarily cooled, many heat pump systems utilize supplemental heat, such as resistive heating or gas, to warm the cool air injected into the building while the heat pump operates in a reverse cycle. This results in system inefficiencies and additional energy costs.

What is needed, therefore, is a system that can reduce frost accumulation on the evaporator coil without adding cool air into the warmed building and without unnecessarily wasting energy. This and other problems are addressed by the technology disclosed herein.

SUMMARY

The disclosed technology relates generally to systems and methods for reducing frost accumulation on heat pump evaporator coils. The disclosed technology can include a system for reducing accumulation of frost on a heat pump evaporator coil. The system can include a heat pump assembly having an evaporator coil, a fan that can direct air across at least a portion of the evaporator coil, a temperature sensor that can output temperature data indicating a temperature of the evaporator coil, and a controller. The controller can energize the fan to direct air across the evaporator coil if the temperature of the evaporator coil is below a threshold temperature.

The controller can also energize the fan for a predetermined amount of time when it determines the temperature of the evaporator coil is below a threshold temperature. The controller can also energize the fan for a predetermined amount of time if it determines the temperature of the evaporator coil has been below a threshold temperature for a predetermined amount of time.

Additionally, the controller can energize the fan to operate at a reduced capacity and deenergize the fan if it receives an input from the temperature sensor indicating that the temperature of the evaporator coil has risen above a predetermined temperature.

The system can also have another temperature sensor that can detect a temperature of the ambient air. The controller can energize the fan for a predetermined amount of time when it determines that the ambient air temperature is within a predetermined temperature range. Alternatively, the controller can energize the fan for a predetermined amount of time in response to determining that the temperature of the evaporator coil is below a threshold temperature and the ambient air temperature is within a predetermined temperature range.

The system can also have a humidity sensor that can detect a humidity level of ambient air. The controller can energize the fan for a predetermined amount of time when it determines that the temperature of the evaporator coil is below a threshold temperature and the humidity level of the ambient air is above a predetermined humidity level. Alternatively, the controller can energize the fan for a predetermined amount of time when it determines that the temperature of the evaporator coil has been below a threshold temperature for a predetermined amount of time and the humidity level of the ambient air is above a predetermined humidity level.

As another example, the controller can energize the fan for a predetermined amount of time when it determines that the temperature of the evaporator coil is below a threshold temperature, the ambient air temperature is within a predetermined temperature range, and the humidity level of the ambient air is above a predetermined humidity level. The system can also include a reversing valve that can be opened when the controller sends a control signal. When the reversing valve is opened, the residual heat of the refrigerant in the system can provide additional heat to the evaporator coil.

The disclosed technology can also include a method of reducing accumulation of frost on an evaporator coil. The method can include receiving temperature data that is indicative of a temperature measured by a temperature sensor, determining, based at least in part on the temperature data, if an evaporator coil of a heat pump heating system is likely to have frost accumulation, determining if a heat pump system is no longer operating in a heating mode, and outputting instruction to energize the fan to direct air across the evaporator coil. The temperature data can include temperature data of the evaporator coil temperature and the ambient air temperature.

The method can also include receiving humidity data from humidity sensor that is indicates the humidity level of the ambient air and determining if the evaporator coil is likely to have frost accumulation based on the temperature data and the humidity data.

Alternatively, the method can include determining if the temperature of the evaporator coil has risen above a freezing temperature of water to determine when to shut off the fan. The method can also include opening a reversing valve to allow the residual heat of the refrigerant in the system to warm the evaporator coil.

Additional features, functionalities, and applications of the disclosed technology are discussed herein in more detail.

BRIEF DESCRIPTION OF THE DRAWINGS

The accompanying drawings, which are incorporated in and constitute a part of this specification, illustrate multiple examples of the presently disclosed subject matter and serve to explain the principles of the presently disclosed subject matter. The drawings are not intended to limit the scope of the presently disclosed subject matter in any manner.

DETAILED DESCRIPTION

The disclosed technology relates to systems and methods for reducing frost accumulation on heat pump evaporator coils. The disclosed technology, for example, can reduce frost accumulation on an evaporator coil by directing warmer ambient air across the evaporator coil after the heat pump is shut down (i.e., no longer operating in a heating mode). When the heat pump is operating in a heating mode under certain conditions, frost will accumulate on the evaporator coil because the evaporator coil temperature falls below the freezing temperature of water and the moisture in the warmer ambient air condenses on the evaporator coil and eventually freezes. To reduce the accumulated frost, the disclosed technology includes, among other examples herein described, energizing a fan after the heat pump has shut down to direct the warmer ambient air across the evaporator coil to melt the accumulated frost. The disclosed technology can be used with any heat pump system used to heat a building having an outdoor unit with an evaporator, a temperature sensor, and a fan, but is not so limited.

Although certain examples of the disclosed technology are explained in detail, it is to be understood that other examples, embodiments, and implementations of the disclosed technology are contemplated. Accordingly, it is not intended that the disclosed technology is limited in its scope to the details of construction and arrangement of components set forth in the following description or illustrated in the drawings. The disclosed technology may be implemented in a variety of embodiments and may be practiced or carried out in various ways. In particular, the presently disclosed subject matter is described in the context of being a system for reducing frost accumulation on heat pump evaporator coils used to heat a building. The present disclosure, however, is not so limited, and can be applicable in other contexts where frost is likely to accumulate on a heat pump system. The present disclosure, for example and not limitation, can include any other heat pump heating system that is likely to accumulate frost including water heaters, pool heaters, district heating systems, and various industrial applications. Such implementations and applications are contemplated within the scope of the present disclosure. Accordingly, when the present disclosure is described in the context of a system for reducing frost accumulation on heat pump evaporator coils used to heat a building, it will be understood that other implementations can take the place of those referred to.

It should also be noted that, as used in the specification and the appended claims, the singular forms "a," "an," and "the" include plural references unless the context clearly dictates otherwise. References to a composition containing "a" constituent is intended to include other constituents in addition to the one named.

Also, in describing the examples, terminology will be resorted to for the sake of clarity. It is intended that each term contemplates its broadest meaning as understood by those skilled in the art and includes all technical equivalents which operate in a similar manner to accomplish a similar purpose.

Ranges may be expressed herein as from "about" or "approximately" or "substantially" one particular value and/or to "about" or "approximately" or "substantially" another particular value. When such a range is expressed, the various examples of the disclosed technology includes from the one particular value and/or to the other particular value. Further, ranges described as being between a first value and a second value are inclusive of the first and second values. Likewise, ranges described as being from a first value and to a second value are inclusive of the first and second values.

Herein, the use of terms such as "having," "has," "including," or "includes" are open-ended and are intended to have the same meaning as terms such as "comprising" or "comprises" and not preclude the presence of other structure, material, or acts. Similarly, though the use of terms such as "can" or "may" are intended to be open-ended and to reflect that structure, material, or acts are not necessary, the failure to use such terms is not intended to reflect that structure, material, or acts are essential. To the extent that structure, material, or acts are presently considered to be essential, they are identified as such.

It is also to be understood that the mention of one or more method steps does not preclude the presence of additional method steps or intervening method steps between those steps expressly identified. Moreover, although the term "step" can be used herein to connote different aspects of methods employed, the term should not be interpreted as implying any particular order among or between various steps herein disclosed unless and except when the order of individual steps is explicitly required. Further, the disclosed technology does not necessarily require all steps included in the example methods and processes described herein. That is, the disclosed technology includes methods that omit one or more steps expressly discussed with respect to the examples provided herein.

The components described hereinafter as making up various elements of the disclosed technology are intended to be illustrative and not restrictive. Many suitable components that would perform the same or similar functions as the components described herein are intended to be embraced within the scope of the disclosed technology. Such other components not described herein can include, but are not limited to, for example, similar components that are developed after development of the presently disclosed subject matter.

Referring now to the drawings, in which like numerals represent like elements, examples of the present disclosure are herein described. As will be described in greater detail, the present disclosure can include a system and method for reducing frost accumulation on heat pump evaporator coils. To provide a background of the system described in the present disclosure, the basic components of a heat pump heating system are shown in FIG. 1 and will be discussed first.

Figure 1:
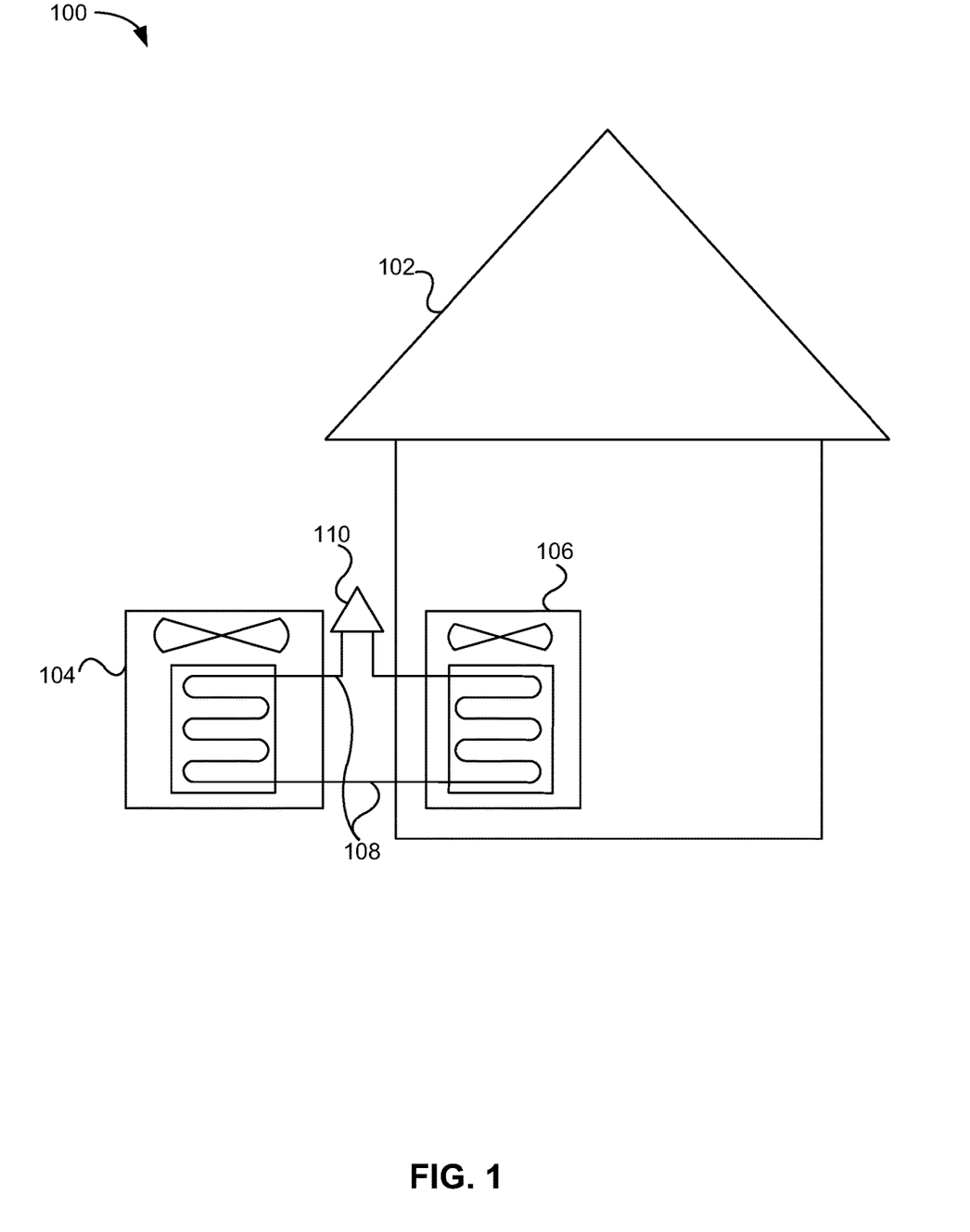
FIG. 1 is a schematic diagram illustrating a basic heat pump heating system used to heat a building, in accordance with the disclosed technology.

As shown in FIG. 1, a heat pump heating system 100 can be used to heat a building 102. The heat pump heating system 100 can comprise an outdoor evaporator unit 104 and an indoor condenser unit 106 connected by refrigerant lines 108. For simplifying the discussion, other components of the heat pump heating system 100 have been omitted but one of skill in the art will appreciate that other components can be used to operate the heat pump heating system 100. The heat pump heating system 100 can also have a reversing valve 110 configured to reverse the flow direction of the refrigerant. By reversing the flow direction with the reversing valve 110, the heat pump heating system 100 can be configured to cool the building 102 rather than heat the building 102. Additionally, opening the reversing valve 110 while the heat pump heating system 100 is no longer operating in a heating mode can allow residual heat in the refrigerant to reach the outdoor evaporator unit 104.

The heat pump heating system 100 can warm the building 102 by moving heat from outside the building 102 to inside the building 102 through a vapor-compression cycle. During this process, it is common for the temperature of the evaporator coil in the outdoor evaporator unit 104 to fall below the temperature of the ambient air causing moisture in the air to condense on the evaporator coil. When the evaporator coil temperature falls below freezing, the condensation accumulated on the evaporator coil can freeze causing a buildup of frost and ice. This is particularly common in regions of the world with a humid climate and cool air temperature where heat pump heating systems 100 are operated to heat buildings 102 for extended periods of time. In these conditions, frost can accumulate to the point where the heat pump heating system 100 operates with a degraded performance or components become damaged.

Figure 2:
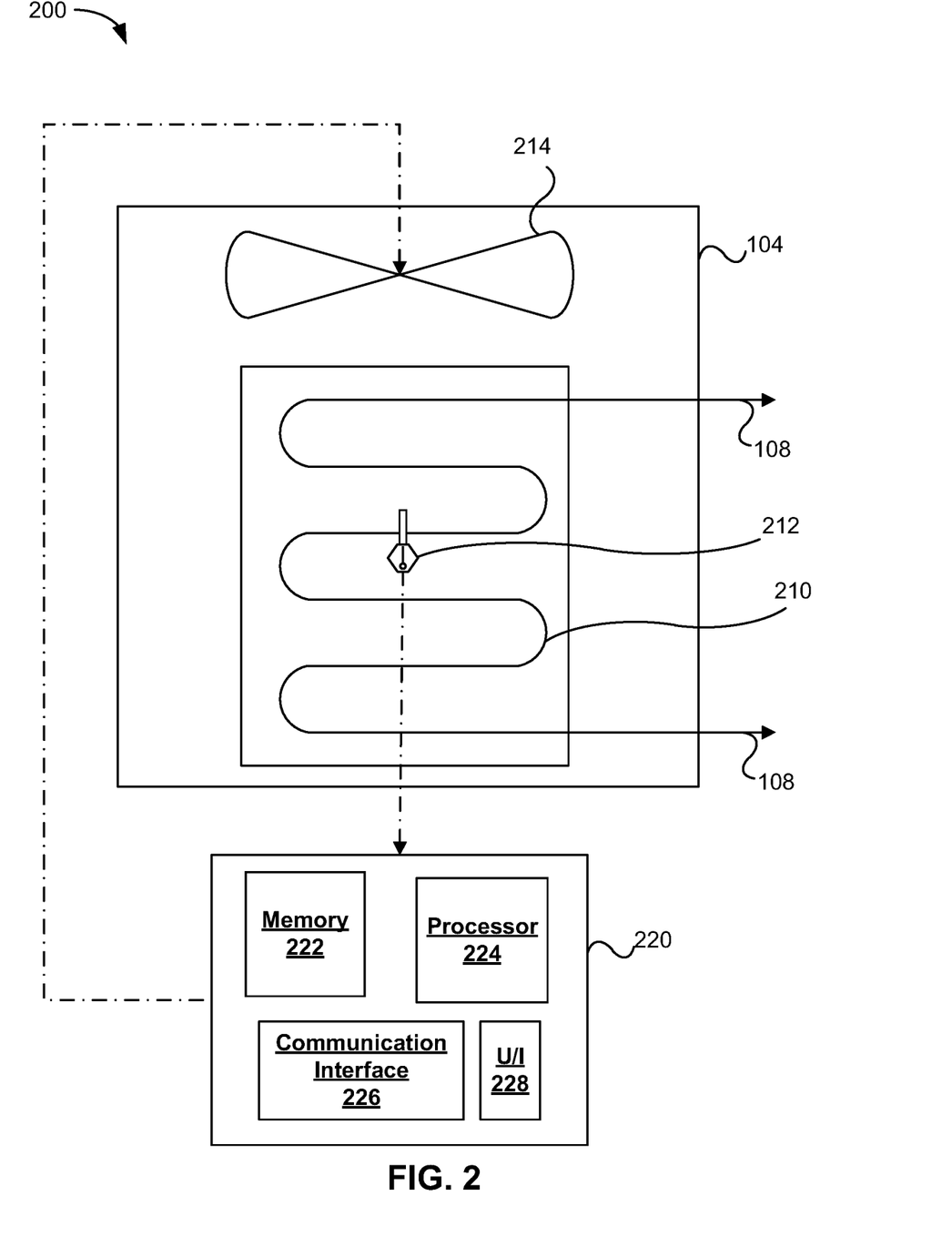
FIG. 2 is a schematic diagram illustrating a system for reducing frost accumulation on an evaporator coil, in accordance with the disclosed technology.

Frost accumulation on an evaporator coil can be reduced by using the systems and methods of the present disclosure. As depicted in FIG. 2, a system for reducing frost accumulation 200 on an outdoor evaporation unit 104 can include, in addition to the components previously discussed, an evaporator coil 210, a coil temperature sensor 212, a fan 214, and a controller 220. The controller 220 can have a memory 222, one or more processors 224, a communication interface 226, and a user interface 228. The memory can have instructions stored thereon that, when executed by the processor(s) 224, cause the system 200 to perform actions, such as those described herein. One of skill in the art will appreciate that the system for reducing frost accumulation 200 can include other components not herein described or fewer components than herein described.

The evaporator coil 210 can be any type of evaporator coil used in a heat pump heating system 100, including, but not limited to, bare tube, plate-type, and finned evaporator coils. Although the disclosed technology is described in the context of being for application in outdoor evaporator units used to heat a building, the disclosed technology can be used in any evaporator unit where the evaporator coil temperature falls below the freezing temperature of the surrounding fluid and the ambient fluid temperature remains above the freezing temperature of the fluid.

To determine the temperature of the evaporator coil 210, the coil temperature sensor 212 can be configured to detect the temperature of the evaporator coil 210 and output the detected temperature to the controller 220. The coil temperature sensor 212 can be configured to detect the temperature of the evaporator coil 210 continuously or periodically when the heat pump heating system 100 is shut down, while the heat pump heating system 100 is operating, or both. The coil temperature sensor 212 can be installed directly on the surface of the evaporator coil 210, inside of the evaporator coil 210, partially inside of the evaporator coil, or near the evaporator coil 210. Additionally, the coil temperature sensor 212 can be configured to measure the surface temperature, the core temperature, a temperature of a portion of the evaporator coil 210, or any other method of measuring as would be suitable for the particular application and arrangement. The coil temperature sensor 212 can include any type of sensor capable of measuring the temperature of the evaporator coil 210. For example, the temperature sensor 212 can be or include a thermocouple, a resistor temperature detector (RTD), a thermistor, an infrared sensor, a semiconductor, or any other suitable type of sensor for the application.

The fan 214 can be any type of fan configured to direct air across at least a portion the evaporator coil 210. The fan 214, for example, can be an axial-flow fan, a centrifugal fan, a crossflow fan, or any other type of fan suitable for the application so long as the fan 214 is configured to direct air across the evaporator coil 210. The fan 214 can be the same fan used to operate the outdoor evaporator unit 104 or the fan 214 can be a separate fan installed specifically to direct air across the evaporator coil 210 to reduce frost buildup (as will be described in greater detail in relation to the auxiliary fan 314 in FIG. 3). The fan 214 can also be coupled with a variable-speed motor or a single-speed motor depending on the application. Furthermore, in applications where the evaporator coil 210 is surrounded by a fluid other than air, the fan 214 can alternatively be an impeller, propeller, pump, or any other fluid moving device suitable for the application.

The fan 214 can be controlled by the controller 220. The controller 220 can have a memory 222, and a processor 224. The controller 220 can be a computing device configured to receive data, determine actions based on the received data, and output a control signal instructing one or more components of the system to perform one or more actions. One of skill in the art will understand that the controller 220 can be installed in any location, provided the controller 220 is in communication with at least some of the components of the system. Furthermore, the controller 220 can be configured to send and receive wireless or wired signals and the signals can be analog or digital signals. The wireless signals can include Bluetooth™, BLE, WiFi™, ZigBee™, infrared, microwave radio, or any other type of wireless communication as may be appropriate for the particular application. The hard-wired signal can include any directly wired connection between the controller and the other components. For example, the controller 220 can have a hard-wired 24 VDC connection to the coil temperature sensor 212. Alternatively, the components can be powered directly from a power source and receive control instructions from the controller 220 via a digital connection. The digital connection can include a connection such as an Ethernet or a serial connection and can utilize any appropriate communication protocol for the application such as Modbus, fieldbus, PROFIBUS, SafetyBus p, Ethernet/IP, or any other appropriate communication protocol for the application. Furthermore, the controller 220 can utilize a combination of wireless, hard-wired, and analog or digital communication signals to communicate with and control the various components. One of skill in the art will appreciate that the above configurations are given merely as non-limiting examples and the actual configuration can vary depending on the application.

The controller 220 can include a memory 222 that can store a program and/or instructions associated with the functions and methods described herein and can include one or more processors 224 configured to execute the program and/or instructions. The memory 222 can include one or more suitable types of memory (e.g., volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like) for storing files including the operating system, application programs (including, for example, a web browser application, a widget or gadget engine, and or other applications, as necessary), executable instructions and data. One, some, or all of the processing techniques described herein can be implemented as a combination of executable instructions and data within the memory.

The controller 220 can also have a communication interface 226 for sending and receiving communication signals between the various components. Communication interface 226 can include hardware, firmware, and/or software that allows the processor(s) 224 to communicate with the other components via wired or wireless networks, whether local or wide area, private or public, as known in the art. Communication interface 226 can also provide access to a cellular network, the Internet, a local area network, or another wide-area network as suitable for the particular application.

Additionally, the controller 220 can have a user interface 228 for displaying system information and receiving inputs from a user. The user, for example, can input data to set the temperature range, threshold temperature, humidity range, and length of time the fan is configured to run after the heat pump heating system has shut down. The user interface 228 can be installed locally on the outdoor evaporator unit 104, inside the building 102, or be a remote-control device such as a mobile device.

The system for reducing frost accumulation 200 on an outdoor evaporator unit 104 can operate by the controller 220 receiving inputs from the coil temperature sensor 212 and determining whether to send a control signal to run the fan 214. The controller 220 can use the inputs from the coil temperature sensor 212, for example, to determine if the temperature of the evaporator coil 210 has fallen below a threshold temperature. The threshold temperature can be the freezing temperature of water (i.e., 32° F.), a temperature above the freezing temperature of water (e.g., 35° F.), or a temperature below the freezing temperature of water (e.g., 29° F.), or any other suitable threshold temperature for the application.

If the temperature of the evaporator coil 210, as detected by the coil temperature sensor 212, has fallen below the threshold temperature, the controller 220 can determine that the fan 214 should run for a predetermined length of time after the heat pump heating system 100 is shut down (e.g., when the heat pump is no longer running in a heating mode). By running the fan 214 for a length of time after the heat pump heating system 100 has shut down, the fan 214 can redirect warmer ambient air across the cooler evaporator coil 210 and melt frost that may have accumulated on the evaporator coil 210. In situations where the temperature of the evaporator coil 210 falls below the freezing temperature of water but the ambient air remains above freezing, for example, the fan 214 can redirect the warmer ambient air across the evaporator coil 210 to bring the temperature of the evaporator coil 210 above the freezing temperature of water to melt accumulated frost from the evaporator coil 210. The controller 220 can be configured to run the fan 214 for any predetermined length of time that would be suitable for the application. For example, the controller 220 can be configured to run the fan 214 for 1 minute, 5 minutes, 10 minutes, 30 minutes, 1 hour, or any other length of time suitable for the application, after the heat pump heating system 100 has been shut down.

To demonstrate how the system for reducing frost accumulation 200 could be employed, the following example is given for illustrative purposes. In this example, if the coil temperature sensor 212 detects that the temperature of the evaporator coil 210 has fallen below 32° F., the controller 200 can send a control signal to the fan 214 to continue running the fan 214 for five minutes when the heat pump heating system 100 has shut down. By running the fan 214 for five minutes after the heat pump heating system 100 has been shut down, the fan 214 can direct the warmer ambient air across the evaporator coil 210 to bring the temperature of the evaporator coil 210 back to a temperature above the freezing temperature of water to melt accumulated frost off the evaporator coil 210 prior to the next time the heat pump heating system 100 begins to run. As one of skill in the art will appreciate, the previous example is given merely for illustrative purposes and should not be construed as limiting. The length of time the fan 214 is run after the heat pump heating system 100 is shut down can be varied as would be suitable for the given application. For example, for larger heat pump heating systems 100 and systems in humid climates, the fan 214 can be run longer to allow for more time for accumulated frost to melt. Alternatively, the fan 214 can be run for shorter lengths of time for smaller heat pump heating systems 100 or systems 100 in more arid climates.

As another illustrative example, the controller 220 can be configured to alter the amount of time the fan 214 is run after the heat pump heating system 100 is shut down if the coil temperature sensor 212 detects the temperature of the evaporator coil 210 has fallen below a threshold temperature for a predetermined length of time. For example, if the controller 220 determines the temperature of the evaporator coil 210 has fallen below 35° F. (or any other threshold temperature) for longer than 15 minutes, the controller 220 can send a control signal to run the fan 214 for five minutes after the heat pump heating system 100 has shut down. Whereas, if the controller 220 determines the temperature of the evaporator coil 210 has fallen below 35° F. (or any other threshold temperature) for longer than 30 minutes, the controller 220 can send a control signal to run the fan 214 for ten minutes after the heat pump heating system 100 has shut down. As will be appreciated, the actual times can be varied depending on the particular application.

The controller 220 can also be configured to alter the amount of time the fan 214 is run after the heat pump heating system 100 is shut down if the coil temperature sensor 212 detects the temperature of the evaporator coil 210 has fallen below a second, even lower threshold temperature. For example, if the controller 220 determines the temperature of the evaporator coil 210 has fallen below 32° F., the controller 220 can send a control signal to run the fan 214 for five minutes. Whereas, if the controller 220 determines the temperature of the evaporator coil 210 has fallen below 25° F., the controller 220 can send a control signal to run the fan 214 for ten minutes. As will be appreciated, the actual times can be varied depending on the particular application.

In systems where the fan 214 is coupled to a variable-speed motor, the controller 220 can be configured to run the fan 214 at a lower capacity than when the fan is operating normally. For example, the fan 214 can operate at 100% capacity while the heat pump heating system 100 is operating and then continue to operate at 35% capacity to defrost the evaporator coil 210 after the heat pump heating system 100 is shut down. Doing so will conserve energy and reduce the frost accumulation with less noise providing for a more pleasing experience for a user. In this configuration, the controller 220 can be configured to operate the fan 214 at various capacities depending on the conditions detected by the coil temperature sensor 212. The controller 220 can be configured to run the fan 214 at 35% capacity if, for example, the temperature of the evaporator coil 210 is below the threshold temperature for ten minutes or to run the fan 214 at 50% capacity if the evaporator coil is below the threshold temperature for thirty minutes.

As another example, the controller 220 can be configured to proportionally increase the fan 214 capacity in relation to the length of time the temperature of the evaporator coil 210 has been below a threshold temperature. For example, the controller 220 can be configured to increase the capacity of the fan 214 10% with every ten minutes the temperature of the evaporator coil 210 has been below the threshold temperature to defrost the evaporator coil 210 after the heat pump heating system 100 has shut down. Alternatively, the controller 220 can be configured to increase the capacity of the fan 214 and the run time of the fan 214 in proportion to the length of time the temperature of the evaporator coil 210 has been below a threshold temperature. For example, the controller 220 can be configured to increase the capacity of the fan 214 10% and extend the fan 214 run time five minutes with every fifteen minutes the temperature of the evaporator coil 210 has been below the threshold temperature. As one of skill in the art will appreciate, the capacity and run time of the fan 214 can be varied to ensure accumulated frost is melted off the evaporator coil 210 according to the particular application.

As yet another example, the controller 220 can be configured to run the fan 214 when the temperature of the evaporator coil 210 falls below a first predetermined temperature and continue running the fan 214 until the temperature of the evaporator coil 210 rises above a second predetermined temperature. The second predetermined temperature can be, but isn't required to be, the same temperature as the first predetermine temperature. For example, the controller 220 can be configured run the fan 214 when the temperature of the evaporator coil 210 falls below 32° F. and continue to run the fan 214 until the temperature of the evaporator coil 210 rises above 35° F. In this example, the system 200 can be configured to conserve energy because the fan 214 is only run for as long as is needed to bring the evaporator coil 210 temperature high enough to melt the accumulated frost.

In another example, the controller 220 can be configured to run the fan 214 for either a predetermined amount of time or until the evaporator coil 210 rises above a predetermined temperature. For example, the controller 220 can run the fan 214 for the shorter of the predetermined time or the amount of time it takes for the evaporator coil 210 to rise above a predetermined temperature. In this example, the system 200 can be configured to conserve energy according to a user's preference because the fan 214 is not allowed to continue running longer than a predetermined time but will also run for shorter lengths of time if the temperature of the evaporator coil 210 rises above the predetermined temperature before the predetermined time is reached.

Figure 3:
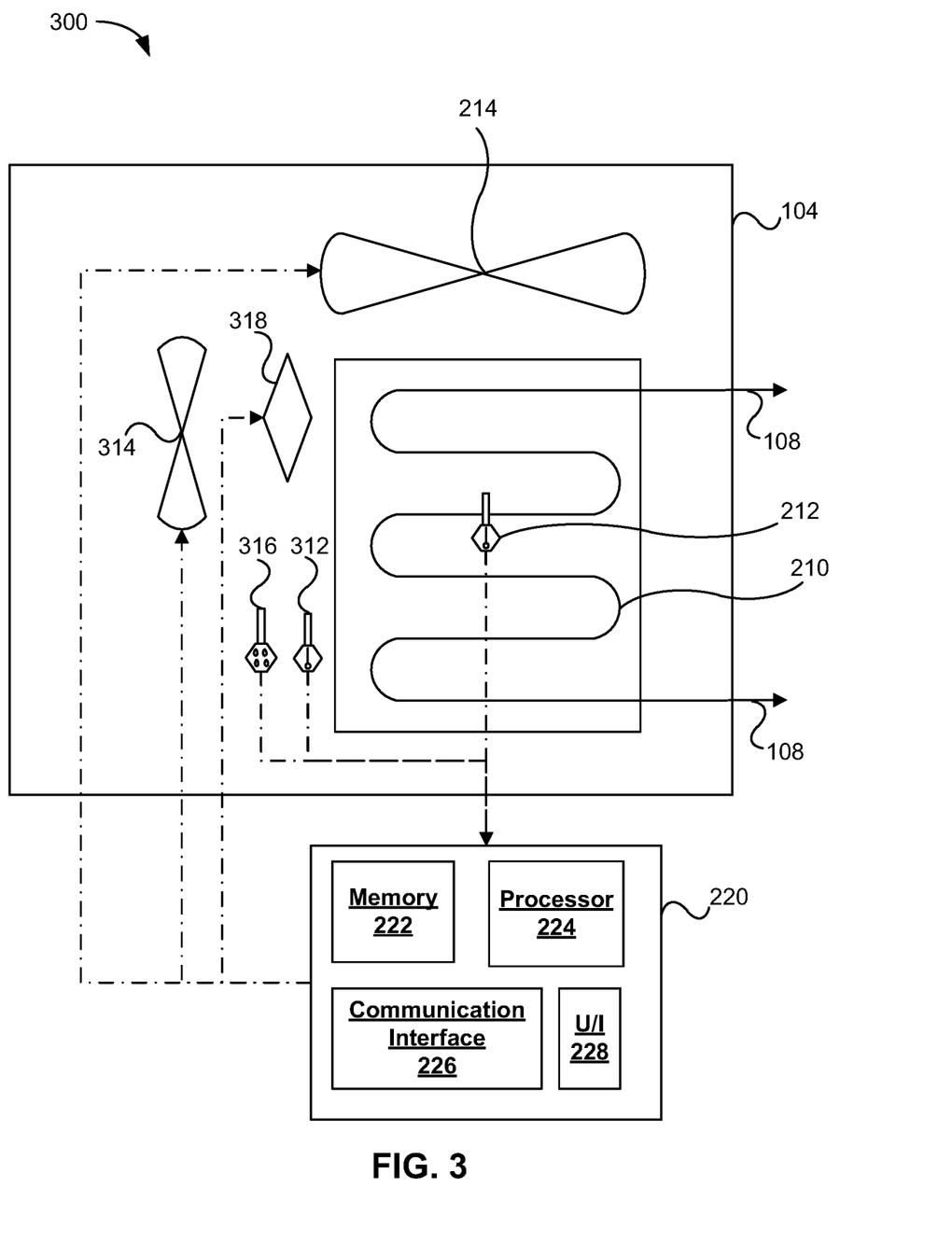
FIG. 3 is a schematic diagram illustrating another system for reducing frost accumulation on an evaporator coil, in accordance with the disclosed technology.

FIG. 3 is a schematic diagram depicting another example system for reducing frost accumulation 300 in accordance with the disclosed technology. The system 300 includes all the same components as those discussed in relation to the system 200 depicted in FIG. 2 but additionally includes an ambient temperature sensor 312, an auxiliary fan 314, a humidity sensor 316, and a supplementary heat source 318. The system 300 can be configured to operate the same as the system 200 as just described in relation to FIG. 2, or the system 300 can be configured to incorporate the additional components depicted in FIG. 3.

The system for reducing frost accumulation 300, for example, can have a controller 220 configured to receive an input from the ambient temperature sensor 312 in addition to the coil temperature sensor 212. The ambient temperature sensor 312 can be configured to detect a temperature of the ambient air to indicate atmospheric conditions near the evaporator coil 210. Additionally, the controller 220 can be configured to receive an input from the humidity sensor 316. The humidity sensor 316 can be configured to detect a humidity level of the ambient air (i.e., the amount of water vapor in the ambient air). The controller 220 can also be configured to output control signals to the auxiliary fan 314 and the supplemental heat source 318 in addition to outputting a control signal to the fan 214.

As an illustrative example to explain how the system 300 can be configured to reduce frost accumulation on an evaporator coil 210, controller 220 can be configured to receive an input from the ambient temperature sensor 312 to determine the temperature of the outside air and the controller 220 can determine if the ambient air temperature is within a predetermined temperature range where frost is likely to accumulate on the evaporator coil 210. For example, if the ambient air temperature, as detected by the ambient temperature sensor 312, is between 30° F. and 65° F., the controller 220 can be configured to determine that frost is likely to have accumulated on the evaporator coil 210 and output a control signal to run the fan 214 for 5 minutes after the heat pump heating system 100 has been shut down.

The controller 220 can also be configured to determine whether to run the fan 214 after the heat pump heating system 100 has been shut down based on an input from the ambient temperature sensor 314 and the coil temperature sensor 214. For example, if the ambient air temperature, as detected by the ambient temperature sensor 312, is between 30° F. and 65° F. and the temperature of the evaporator coil 210, as detected by the coil temperature sensor 212, is at or below 32° F., the controller 220 can be configured to output a control signal to run the fan 214 for a predetermined amount of time after the heat pump heating system 100 has been shut down to defrost the evaporator coil 210.

The controller 220 can also be configured to receive an input from the humidity sensor 316 to determine, based on the concentration of water vapor in the ambient air, if frost is likely to accumulate on the evaporator coil 210. For example, the controller 200 can be configured to receive an input from the humidity sensor 316 and the coil temperature sensor 212 to determine that, based on the water vapor concentration in the ambient air and the temperature of the evaporator coil 210, that frost is likely to have accumulated on the evaporator coil 210. The controller 220 can then output a control signal to run the fan 214 for a predetermined length of time after the heat pump heating system 100 has been shut down to defrost the evaporator coil 210.

Alternatively, the controller 200 can be configured to receive an input from the humidity sensor 316 and the ambient temperature sensor 312 to determine that, based on the water vapor concentration in the ambient air and the ambient air temperature, that frost is likely to have accumulated on the evaporator coil 210. The controller 220 can then output a control signal to run the fan 214 for a predetermined length of time after the heat pump heating system 100 has been shut down to defrost the evaporator coil 210.

As yet another example, the controller 220 can be configured to use inputs received from the coil temperature sensor 212, the ambient temperature sensor 312, and the humidity sensor 316 to determine if frost is likely to accumulate on the evaporator coil 210. The controller 220 can make this determination if, for example, the temperature of the evaporator coil 210 is below the freezing temperature of water and the ambient air temperature and humidity indicate that moisture from the surrounding air is likely to accumulate on the evaporator coil 210 and freeze to form frost and ice. The controller 220 can then output a control signal to run the fan 214 for a predetermined length of time after the heat pump heating system 100 has been shut down to defrost the evaporator coil 210.

As an illustrative example, if the ambient air temperature, as detected by the ambient temperature sensor 312, is between 30° F. and 65° F., the temperature of the evaporator coil 210, as detected by the coil temperature sensor 212, is at or below 32° F., and the humidity of the ambient air, as detected by the humidity sensor 316, is above 50%, the controller 220 can be configured to output a control signal to run the fan 214 for 5 minutes after the heat pump heating system 100 has been shut down. As will be appreciated, the controller 220 can be configured to run the fan for various lengths of time and capacities, as previously described, based on the inputs received from the coil temperature sensor 212, the ambient temperature sensor 312, and the humidity sensor 316.

The system 300 can also be configured to reduce frost accumulation on the evaporator coil 210 using the auxiliary fan 314 and the supplemental heat source 318. For example, if the controller 220 determines that frost is likely to have accumulated on the evaporator coil 210 using any of the methods described previously, the controller 220 can output a signal to run the auxiliary fan 314, the auxiliary fan 314 and the fan 214 together, the supplemental heat source 318, the supplemental heat source 318 with either or both the auxiliary fan 314 and the fan 214, or any combination of the fan 214, the auxiliary fan 314, and the supplemental heat source 318. As will be appreciated, the fan 214, the auxiliary fan 314, and the supplemental heat source 318 can each be powered on for varying lengths of time and at varying capacities as described in relation to the fan 214 previously.

As an illustrative example, if the temperature of the evaporator coil 210, as detected by the coil temperature sensor 212, is at or below 32° F., and the humidity level of the ambient air, as detected by the humidity sensor 316, is above 50%, the controller 220 can be configured to output a control signal to run the fan 214 and the auxiliary fan 314 for 5 minutes. Alternatively, the controller 220 can be configured to output a signal to run just the auxiliary fan 314 for 5 minutes or just the supplemental heat source 318 for five minutes.

The humidity sensor 316, sometimes referred to as a hygrometer, can be any type of humidity sensor configured to detect a level of water vapor in the ambient air. For example, the humidity sensor 316 can be a capacitive, resistive, thermal, gravimetric, optical, or any other suitable type of humidity sensor for the application. The humidity sensor 316 can be configured to measure absolute humidity, relative humidity, or specific humidity and can send digital or analog signals to the controller 220.

The supplemental heat source 318 can be any form of supplemental heat source configured to provide additional heat to the evaporator coil 210 to reduce frost accumulation. For example and not limitation, the supplemental heat source 318 can be a burner assembly configured to burn natural gas, propane, or any other combustible matter. The supplemental heat source 318 can also be an electrical heat system such as a resistive heating element, heat tape, a supplemental heat pump. Furthermore, the supplemental heat source 318 can be configured to provide heat directly to the evaporator coil 210 (e.g., heat tape placed directly on the evaporator coil), or the supplemental heat source 318 can be configured to be used in combination with the fan 214 or auxiliary fan 314 to warm the air directed across the evaporator coil 210 by the fan 214 or auxiliary fan 314.

In any of the configurations described in relation to FIGS. 2 and 3, the controller 220 can also be configured to open the reversing valve 110 after the heat pump heating system 100 has been shut down to allow residual heat in the refrigerant to warm the evaporator coil 210 to assist in melting the accumulated frost. Opening the reversing valve 110 when the heat pump is shut down can be advantageous because the residual heat in the refrigerant can warm the inside of the evaporator coil 210 while the system 200 or 300 warms the outside of the evaporator coil 210, thus decreasing the amount of time it takes to remove frost from the evaporator coil. Furthermore, opening the reversing valve 110 also provides for efficient energy use because the residual heat in the refrigerant would be otherwise wasted.

Furthermore, in any of the configurations described in relation to FIGS. 2 and 3, the controller 220 can be configured to monitor the temperature of the evaporator coil 210 to determine when to turn off the fan 214, the auxiliary fan 314, and/or the supplemental heat 318. For example, the controller 220 can continue to receive inputs from the coil temperature sensor 212 to determine if the temperature of the evaporator coil 210 has risen above the freezing temperature of water. If the temperature of the evaporator coil 210 has risen above the freezing temperature of water, the controller 220 can determine that the fan 214, the auxiliary fan 314, and/or the supplemental heat 318 should be shut down because it is likely that the accumulated frost has melted.

Figure 4:
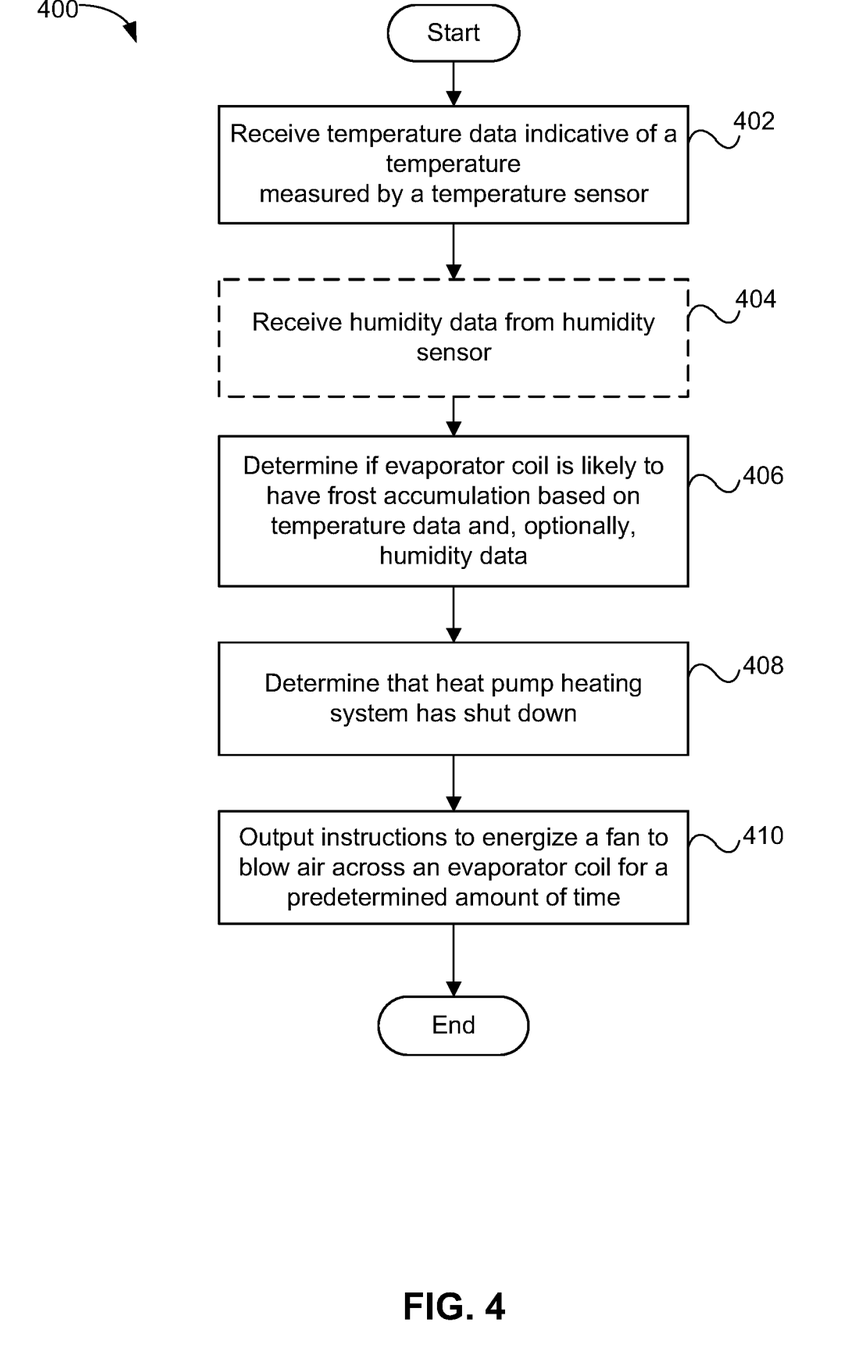
FIG. 4 is a flow diagram illustrating a method of reducing frost accumulation on an evaporator coil, in accordance with the disclosed technology.

FIG. 4 is a flow diagram illustrating a method 400 of reducing frost accumulation on an evaporator coil, in accordance with the disclosed technology. FIG. 4 is not meant to limit the methods of reducing frost accumulation on an evaporator coil but is offered merely for illustrative purposes. Furthermore, one of skill in the art will understand that the method 400 depicted in FIG. 4 can be altered as necessary to encompass the many different configurations of the systems as previously discussed in relation to FIGS. 2 and 3 or other configurations not discussed.

In an example shown in FIG. 4, the method 400 can include receiving temperature data 402 from the temperature sensor. The temperature sensor referred to in this example can be the coil temperature sensor 212 and/or the ambient temperature sensor 312 previously described. Optionally, the method 400 can include receiving humidity data 404 from the humidity sensor. The method 400 can include determining 406 if the evaporator coil is likely to have frost accumulation based on the temperature data and, optionally, the humidity data received. The method 400 can also include determining 408 that the heat pump heating system has shut down and outputting 410 instructions for the fan to continue blowing air across the evaporator coil for a predetermined amount of time. As previously described, the fan can be run for various lengths of time as would be suitable for the particular application and the particular conditions.

Figure 5:
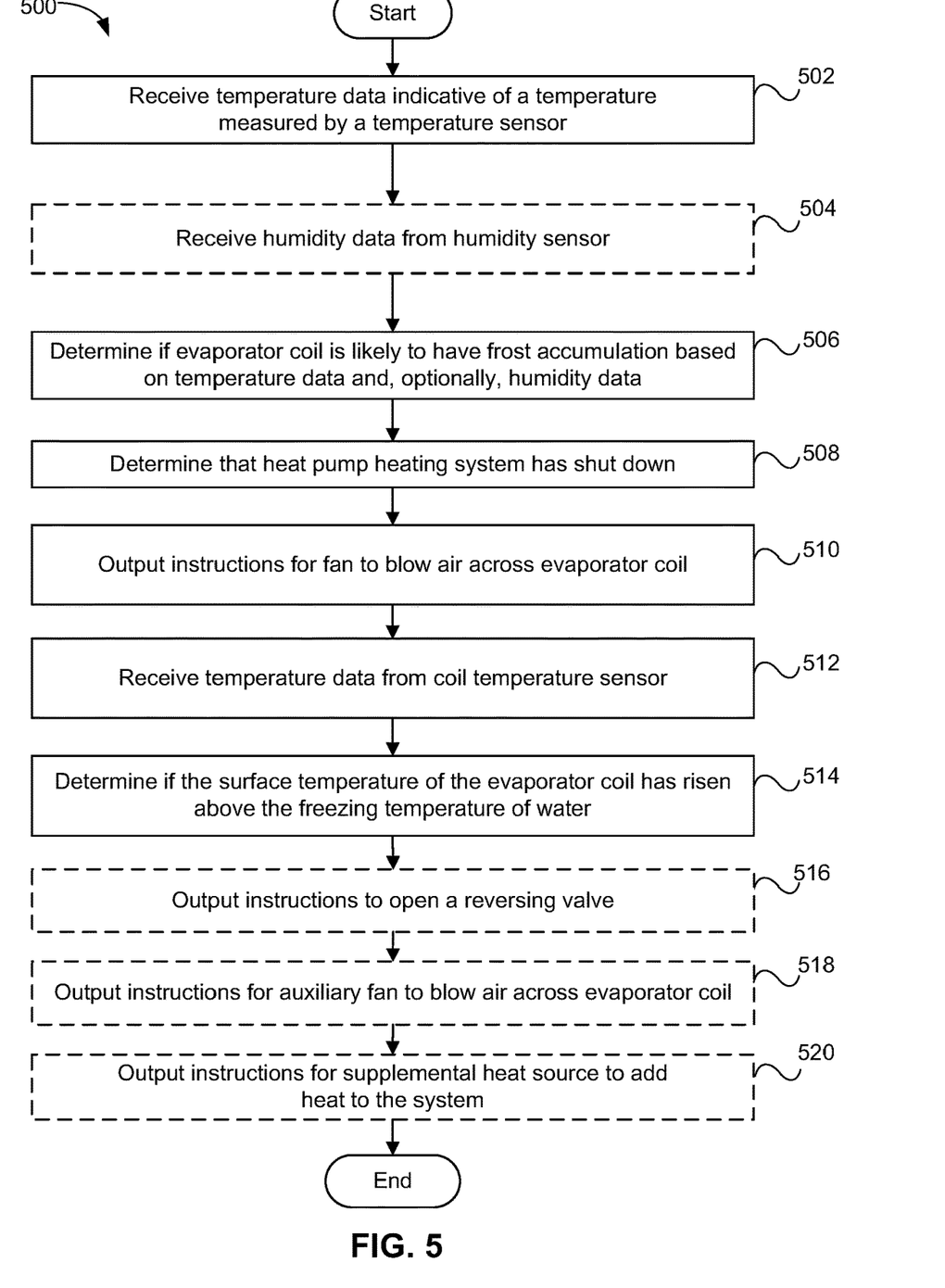
FIG. 5 is a flow diagram illustrating another method of reducing frost accumulation on an evaporator coil, in accordance with the disclosed technology.

FIG. 5 is a flow diagram illustrating another method 500 of reducing frost accumulation on an evaporator coil, in accordance with the disclosed technology. FIG. 5 is similarly not meant to limit the methods of reducing frost accumulation on an evaporator coil but is offered merely for illustrative purposes. Furthermore, one of skill in the art will understand that the method 500 depicted in FIG. 5 can be altered as necessary to encompass the many different configurations of the systems as previously discussed in relation to FIGS. 2 and 3 or other configurations not discussed.

In an example shown in FIG. 5, the method 500 can include receiving temperature data 502 from the temperature sensor. The temperature sensor referred to in this example can be the coil temperature sensor 212 and/or the ambient temperature sensor 312 previously described. Optionally, the method 500 can include receiving humidity data 504 from the humidity sensor. The method 500 can then include determining 506 if the evaporator coil is likely to have frost accumulation based on the temperature data and, optionally, the humidity data received. The method 500 can also include determining 508 that the heat pump heating system has shut down and outputting 510 instructions for the fan to blow air across the evaporator coil. The method 500 can also include receiving temperature data 512 from the coil temperature sensor. This portion of the method 500 can be used to determine 514 if the temperature of the evaporator coil has risen above the freezing temperature of water to determine whether it is likely that accumulated frost has melted off of the evaporator coil. The method 500 can optionally include outputting 516 instructions to open a reversing valve to allow residual heat from the refrigerant to warm the evaporator coil. Optionally, the method 500 can also include outputting instructions 518 for an auxiliary fan to blow air across the outdoor coil and outputting instructions 520 for a supplemental heat source to add heat to the system.

While the present disclosure has been described in connection with a plurality of exemplary aspects, as illustrated in the various figures and discussed above, it is understood that other similar aspects can be used, or modifications and additions can be made to the described aspects for performing the same function of the present disclosure without deviating therefrom. For example, in various aspects of the disclosure, methods and compositions were described according to aspects of the presently disclosed subject matter. But other equivalent methods or composition to these described aspects are also contemplated by the teachings herein. Therefore, the present disclosure should not be limited to any single aspect, but rather construed in breadth and scope in accordance with the appended claims.

What is claimed is:

1. A method of reducing accumulation of frost on an evaporator coil, the method comprising:
   receiving temperature data indicative of a temperature measured by a temperature sensor;
   determining, based at least in part on the temperature data, if an evaporator coil of a heat pump heating system is likely to have frost accumulation;
   determining if a heat pump system has shut down; and
   after determining that the evaporator coil is likely to have frost accumulation and that the heat pump system has shut down, outputting instructions to (1) energize a fan to direct air across at least a portion of the evaporator coil and (2) open a reversing valve to permit residual heat of a refrigerant to heat the evaporator coil.

2. The method of claim 1, wherein the temperature data is indicative of an ambient air temperature.

3. The method of claim 1, wherein, when the heat pump system has shut down, the refrigerant is not circulated through the evaporator coil by the heat pump system.

4. The method of claim 1, wherein the temperature data is indicative of a temperature of the evaporator coil.

5. The method of claim 4, further comprising determining if the temperature of the evaporator coil is greater than a freezing temperature of water.

6. The method of claim 1, further comprising receiving humidity data from a humidity sensor, the humidity data being indicative of a humidity level of ambient air.

7. The method of claim 6, further comprising determining if the evaporator coil is likely to have frost accumulation based on the temperature data and the humidity data.

8. A system for reducing accumulation of frost on a heat pump evaporator coil, the system comprising:
   a heat pump assembly having an evaporator coil;
   a fan configured to direct air across at least a portion of the evaporator coil;
   a temperature sensor configured to output temperature data indicative of a temperature of the evaporator coil; and
   a controller configured to energize the fan at a predetermined reduced capacity relative to a maximum output capacity of the fan to direct air across at least a portion of the evaporator coil in response to determining that the temperature of the evaporator coil is less than a threshold temperature.

9. The system of claim 8, the controller being further configured to deenergize the fan when the controller receives an input from the temperature sensor indicative of the temperature of the evaporator coil being greater than a predetermined temperature.

10. The system of claim 8, further comprising a reversing valve, wherein the controller is configured to send a control signal to open the reversing valve to allow residual heat of a refrigerant to heat the evaporator coil.

11. The system of claim 8, wherein the controller is configured to energize the fan at the predetermined reduced capacity based at least in part on an amount of time during which the temperature of the evaporator coil is less than the threshold temperature.

12. The system of claim 8, the controller being further configured to energize the fan for a predetermined amount of time in response to determining that the temperature of the evaporator coil is less than the threshold temperature.

13. The system of claim 12, the controller being further configured to energize the fan for the predetermined amount of time in response to determining that the temperature of the evaporator coil has been less than the threshold temperature for a second predetermined amount of time.

14. The system of claim 8, further comprising a humidity sensor configured to detect a humidity level of ambient air.

15. The system of claim 14, wherein the controller is further configured to energize the fan for a predetermined amount of time in response to determining that the temperature of the evaporator coil is less than the threshold temperature and the humidity level of the ambient air is greater than a predetermined humidity level.

16. The system of claim 14, the controller being further configured to energize the fan for a first predetermined amount of time in response to determining that the temperature of the evaporator coil has been less than the threshold temperature for a second predetermined amount of time and the humidity level of the ambient air is greater than a predetermined humidity level.

17. The system of claim 8, further comprising a second temperature sensor configured to detect an ambient air temperature.

18. The system of claim 17, wherein the controller is further configured to energize the fan for a predetermined amount of time in response to determining that the ambient air temperature is within a predetermined temperature range.

19. The system of claim 17, the controller being further configured to energize the fan for a predetermined amount of time in response to determining that the temperature of the evaporator coil is less than the threshold temperature and the ambient air temperature is within a predetermined temperature range.

20. The system of claim 17, further comprising a humidity sensor configured to detect a humidity level of ambient air,
   wherein the controller is configured to energize the fan for a predetermined amount of time in response to determining that the temperature of the evaporator coil is less than the threshold temperature, the ambient air temperature is within a predetermined temperature range, and the humidity level of the ambient air is greater than a predetermined humidity level.

* * * * *